United States Patent [19]

Eddens

[11] Patent Number: 4,899,599
[45] Date of Patent: Feb. 13, 1990

[54] STRAIN FORCE SENSOR MEANS

[75] Inventor: Gerald R. Eddens, St. Louis, Mo.

[73] Assignee: Magnetic Power Systems, Inc., Fenton, Mo.

[21] Appl. No.: 129,472

[22] Filed: Dec. 7, 1987

[51] Int. Cl.[4] .................. G01L 5/10; G01L 1/22; G01L 1/26

[52] U.S. Cl. .................. 73/862.48; 73/862.65

[58] Field of Search .......... 73/862.48, 862.65, 862.54; 177/229

[56] References Cited

U.S. PATENT DOCUMENTS

| 3,602,866 | 8/1971 | Saxl | 73/862.48 X |
| 4,326,424 | 4/1982 | Koenig | 73/862.48 |
| 4,467,661 | 8/1984 | Somal | 73/862.65 X |

FOREIGN PATENT DOCUMENTS 2753549  5/1979  Fed. Rep. of Germany ... 73/862.65

*Primary Examiner*—Charles A. Ruehl
*Attorney, Agent, or Firm*—Haverstock, Garrett & Roberts

[57] ABSTRACT

A strain sensor device for measuring tension on a web or strand member including a frame member, a shaft member extending from the frame member and having a web or strand engaging member mounted thereon, the strain sensor device supporting one portion of the shaft on the frame member. The strain sensor device includes a block member having spaced and opposed first and second wall portions located to be arranged substantially normal to the axis of the shaft, the first wall portion being connected to the frame member and the second wall portion being connected to the shaft member, spaced third and fourth wall portions on the block member extending between and integrally connecting the spaced first and second wall portions, at least one of the third and fourth wall portions having a stress concentrating area capable of deflecting under load on the shaft member produced by tension on the web or strand member, strain sensing transducers located on the third wall portion adjacent to the stress concentrating area for producing the response representative of the tension on the web or strand, and a member mounted on one of the first and second wall portions and extendible into spaced relation to the other of said first and second wall portions to limit the amount of possible relative movement therebetween.

38 Claims, 4 Drawing Sheets

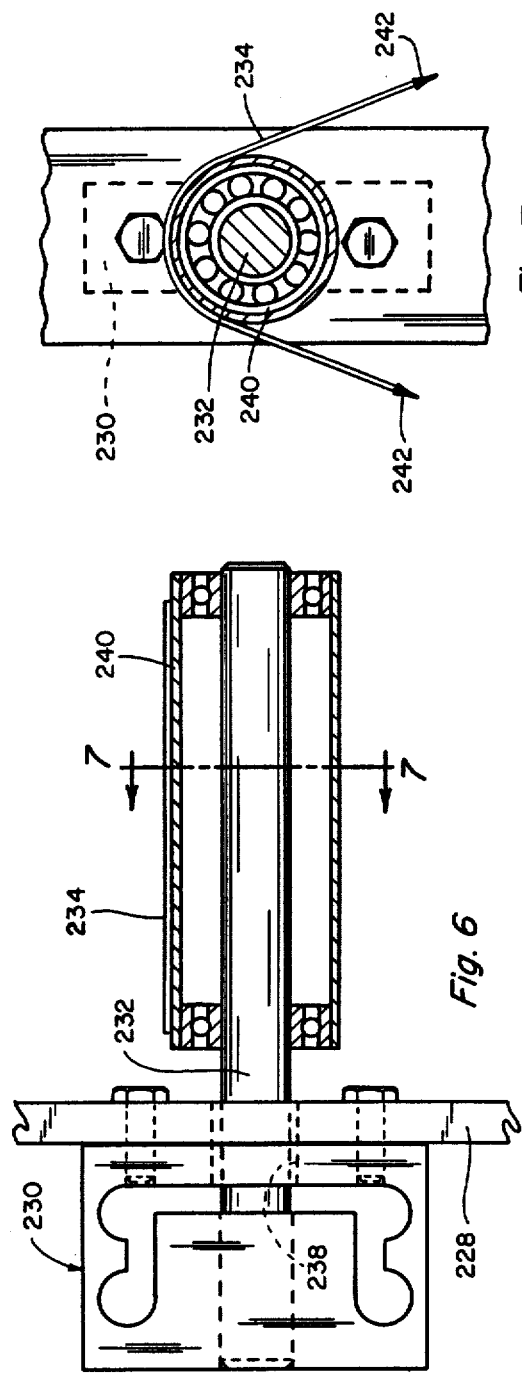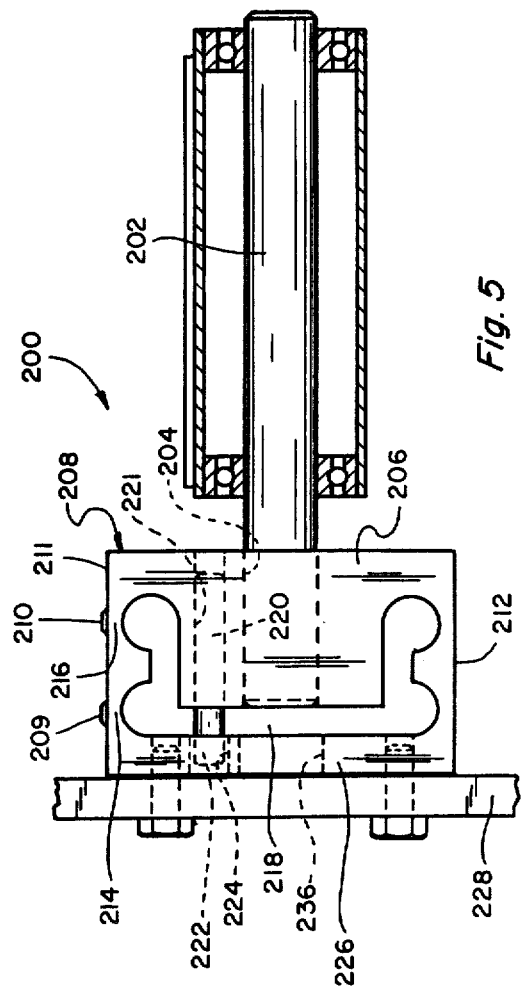

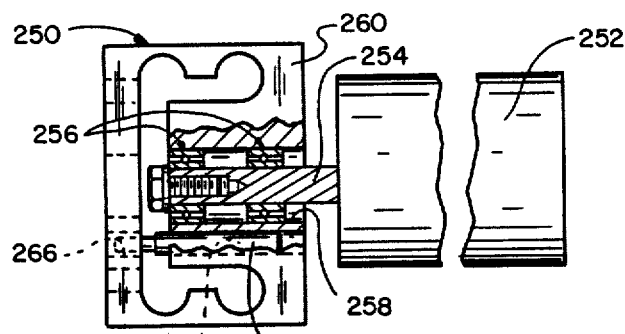
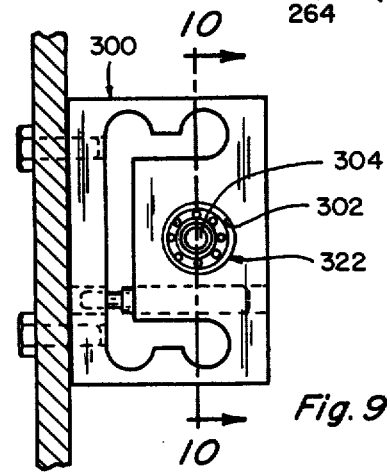
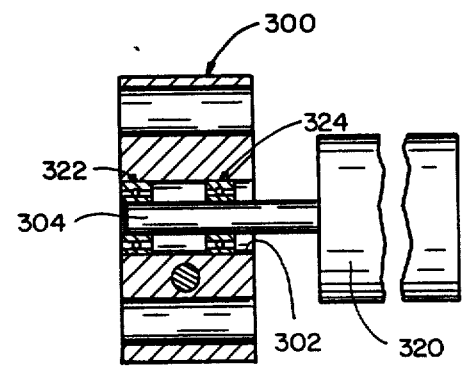
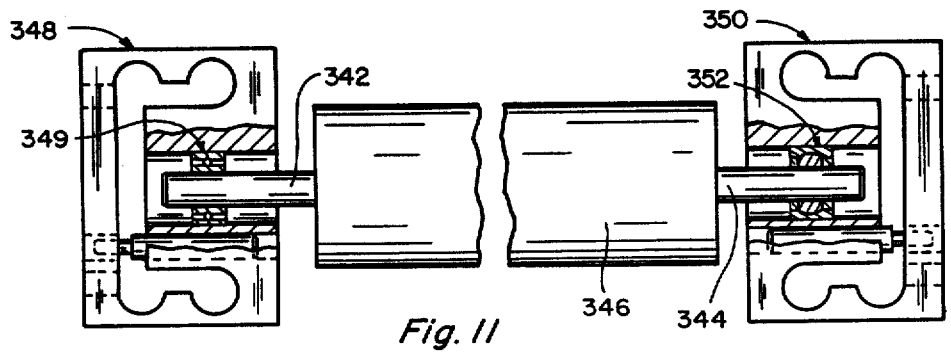
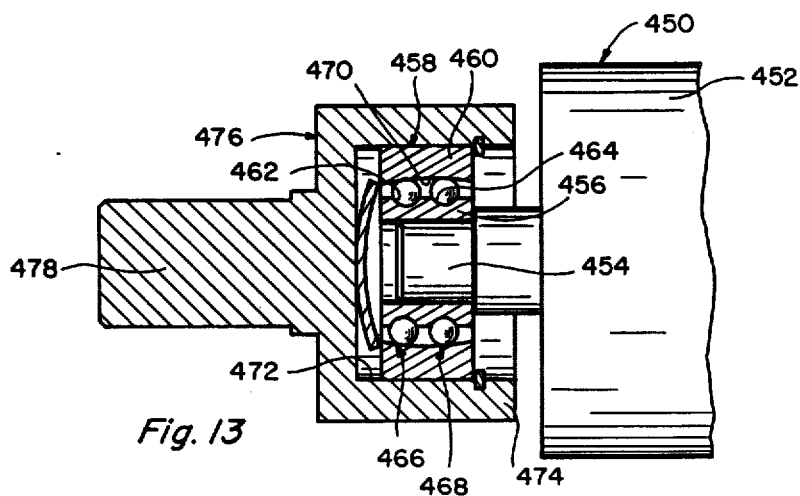

STRAIN FORCE SENSOR MEANS

BACKGROUND OF THE INVENTION

The present invention relates to means for monitoring and measuring strain forces, and more specifically, to improved means for measuring and monitoring strain forces such as tension forces on webs and strands of materials that are fed over, around and between feed rolls for various purposes.

DESCRIPTION OF RELATED ART

There are in existance many strain measuring devices used for various purposes including measuring and monitoring strain forces such as tension forces on webs and strands of materials as they are fed through machinery for various purposes. In many processes where webs and strands are fed, it is important to know the tension on the web or strand for various reasons, including to maintain uniformity of the forces and hence of the product, to avoid breakage, to avoid uneven stress, to compensate for varying forces as the web or strand is wound and unwound from one spool to another by compensating for changes in tension that result because of changes in the diameters of the spools as the web or strand is wound or unwound thereon, and for other reasons. Being able to measure and monitor these forces during feeding of the web or strand is useful especially for the purposes of making adjustments to compensate for changes in the tension.

Among the known devices used for measuring and monitoring strain forces include devices generally referred to as dual beam sensing members which generally include spaced end wall members connected integrally by parallel spaced beam members, which beam members are preferably relatively flexible or bendable in one direction only and have relatively uniform cross-sectional shapes. One of the end walls generally is attached to a support structure and the other end wall is operatively or directly attached to a shaft having means thereon over which a web or strand is fed. The beam members in such devices deflect in substantially parallel relation when tension force is present on the web, and sensing elements are suitably attached to the beam members to respond to tension and compression forces present in the beams. These known devices are relatively expensive to construct and install and can usually only be installed on one side and in one orientation on a support structure and while such devices are fairly widely used because of the above and other limitations they have enjoyed somewhat limited usefulness. The known devices have also been difficult to use in some applications because of the way they are attached to the shafts associated with them. The overload protection features of the known devices have also been relatively expensive to make and have not been entirely satisfactory for some purposes and have not been easily adjustable to accommodate different loads.

A known prior art construction is disclosed in Applicant's own U.S. Pat. No. 4,130,014 which reissued as Re. Pat. No. 31,312. This patent discloses a dual beam construction with a diaphram portion that provides overload protection. The diaphragm portion is attached to a shaft mounting assembly and has a fixed portion attached to the supporting structure and controls the maximum amount of possible movement the beam members can undergo by limiting the amount of displacement that is possible between the shaft and the support structure. The diaphragm also compensates for effects of twisting and other shaft movements and makes it possible to mount the device even when there is some misalignment between support means such as between sensing devices located to support opposite ends of a shaft.

Other patents of general interest to the subject matter of the present case are Koenig U.S. Pat. No. 4,326,424 and Bartlett U.S. Pat. No. 4,056,891, which patents disclose web tension transducers having means that allow some relative angular displacement between a shaft member and a transducer without deflecting the beam members. These patents disclose constructions that are relatively more complicated than the present construction and they do not disclose some of the more important features of the present construction including the use of cantilever support means and the use of a relatively simple yet versatile overload feature.

SUMMARY OF THE INVENTION

The present sensor device overcomes disadvantages and shortcomings associated with prior art sensor devices, is more versatile and easier to use, is less expensive to manufacture and is easy to install and can be installed in more ways in a system. For example, the present construction can be installed on either side of a support structure or wall thereby enabling different length shafts to be used in the same machine if desired. This feature enables the same sensor unit to be used to monitor tension on different width webs without modification of the machine on which it is installed including the machine sensor support structure. The present construction also includes several forms of a relatively simple overload feature which can be easily made to accommodate different ranges of load and which prevents damage to the sensor due to excessive loads. Also, with the present construction, the principal areas of stress concentration can have their thickness reduced for some reason such as to make the device relatively more sensitive. The subject sensors can also be used to support one or both opposite ends of a roller assembly and one such sensor can be used to support a sheave around which a thread or strand of material moves.

The overload feature in the present construction may include a simple pin fixedly mounted in a bore in one portion of the device and extendible into a bore of greater diameter than the pin portion in another portion thereof to limit the amount of possible movement between the different sensor portions. Several forms of this overload feature are disclosed. The overload may also include the shaft of the roll assembly itself and it may include a bore having different diameter portions, all of which operate to limit the amount of possible relative movement between the relatively movable portions of the sensor.

The means for coupling the sensor to the roll assembly includes the possibility of a simple cantilever construction and the provision of means to limit or prevent relative rotational movement between the shaft support means and the sensor assembly is also disclosed and is believed to be novel in the present construction.

The present sensor is constructed to concentrate stress forces in limited portions of the deflectable portions of the sensor which is an advantage both in construction and operation. Stress concentration is achieved in the present construction by mounting the strain sensing elements or transducers on relatively thin portions of the sensor members or block. The stress concentration areas will therefore undergo more bending under load than thicker portions of the deflectable beam members, and the force concentration therefore causes relatively greater changes to occur in the transducers mounted thereon. This magnifies the changes produced in the transducers.

The construction of the subject load sensor member also makes it possible to mount it in more different positions on a support structure, and this makes it possible for a given machine to be able to handle webs of different widths simply by relocating the sensors on the machine walls. For example, the present sensors can be mounted on the inside or on the outside of a machine frame or wall member, and the shaft for the roll assembly can therefore have different lengths depending on whether it is supported by the sensors mounted on one or the other opposite sides of the support walls. These alternative mounting possibilities add to the versatility of the subject device and substantially increase the usefulness of the machines or devices on which they are installed and without changing the construction and operation of the machine or device. Thus, the present sensors enlarge the possibilities and versatility of known devices used for the same or similar purposes and without adversely effecting the operation of the strain sensing means and circuits.

Furthermore, and importantly, the present sensors can be used to support a shaft for a roll assembly in a cantilever manner which has advantages in simplicity of construction. Also, two sensors per roll can be employed and generally the roll shaft is directly engaged with, attached to and supported by the sensor units although means may be provided to prevent binding therebetween under load. For example, when employing one or more of the present sensors per roll shaft, bearing means such as a spherical bearing assembly or like device may be used to prevent angular displacements between the roll shaft and the sensors from adversely effect the operations and to minimize or eliminate the production of twisting forces therebetween which can distort the outputs of the transducers.

It is therefore a principle object of the present invention to provide improved means for measuring and monitoring the tension on a web or strand where it extends over or around a roll such as a feed roll.

Another object is to provide improved overload protection means for load sensing devices.

Another object is to provide a cantilever connection between a shaft member on a load sensor device.

Another object is to provide improved means for concentrating the effects of forces sensed by load sensing means.

Another object is to provide improved means to compensate for misalignment between spaced shaft support means used for supporting opposite ends of a shaft member.

Another object is to provide a load sensor which is capable of being constructed to be mounted in more different positions and orientations on a support structure to allow the user a greater variety of mounting choices.

Another object is to provide an improved load sensor which can be used with devices having feed rolls over which webs or strands of material are fed.

Another object is to provide relatively inexpensive means for accurately measuring and monitoring tension on a web or strand that is fed over and around a feed roll, a sheave or a pulley.

Another object is to teach the construction of a sensor having transducers mounted on spaced parallel deflectable portions at locations of reduced cross section to concentrate the areas of maximum deflection under load.

Another object is to minimize the effects of nonlinear distortions on a shaft supported at at least one end by means capable of sensing lateral forces on the shaft.

Another object is to make it possible to increase the width of a web whose tension can be sensed by a given machine.

These and other objects and advantages of the present invention will become apparent after considering the following detailed specification disclosing several embodiments of web tension sensing means in conjunction with the accompanying drawings wherein:

BRIEF DESCRIPTION OF THE DRAWINGS

FIG. 5 is a side elevational view showing another embodiment of the present sensor shown engaged with an end portion of a roll shaft;

FIG. 6 is a side elevational view showing another embodiment of the present sensor shown mounted in a different location on a support structure;

FIG. 7 is a cross-sectional view taken on line 7—7 of FIG. 6;

FIG. 8 is a side elevational view partly in cross-section showing another sensor device with means therein for supporting a roll shaft assembly;

FIG. 9 is a side elevational view of another embodiment of the present sensor constructed to support a roll shaft extending therefrom at a different direction;

FIG. 10 is a cross-sectional view taken on line 10—10 of FIG. 9;

FIG. 11 is a side elevational view partly in cross-section showing a roll shaft assembly supported at opposite ends by differently constructed roll support means;

FIG. 13 is a side elevational view partly in cross-section showing another means for supporting one end of a roll shaft.

DETAILED DESCRIPTION OF THE PREFERRED EMBODIMENTS

Figure 1:
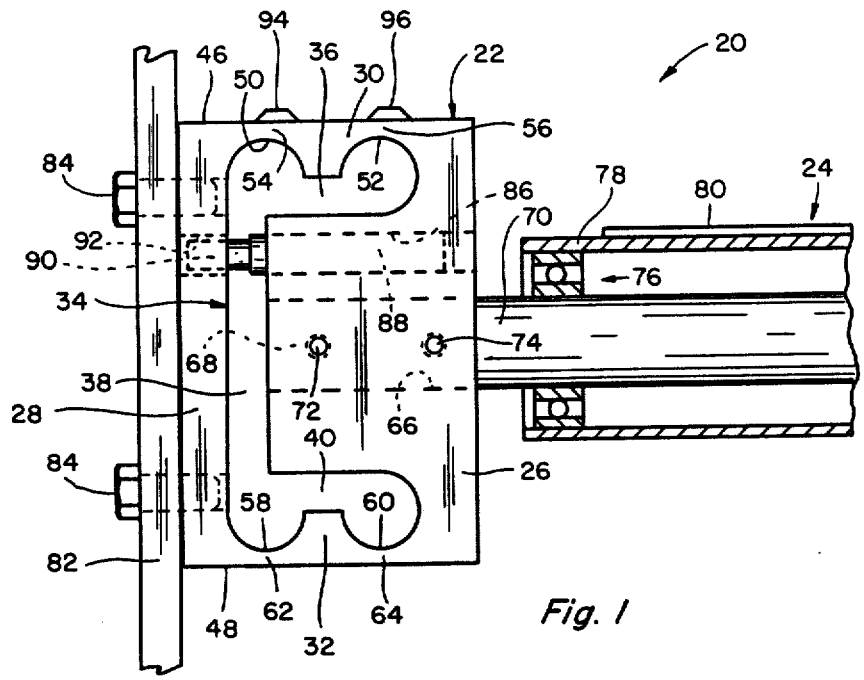
FIG. 1 is a side elevational view of a sensor device constructed according to one embodiment of the present invention, said sensor being shown associated with the end portion of a shaft having a roller over which a web member whose tension is to be sensed extends.

Referring to the drawings more particularly by reference numbers, number 20 in FIG. 1 refers to a sensor assembly including a sensor member 22 which is also referred to herein as a sensor or sensor block constructed according to one embodiment of the present invention. The sensor 22 is shown supporting one end of a roll shaft assembly 24. The sensor assembly 20 may include a housing of suitable size and shape a no such housing is shown to simplify understanding the invention.

The sensor member 22 is shown being a block having spaced wall portions 26 and 28 connected at spaced locations by spaced deflectable wall portions 30 32. The respective wall portions 26 and 28, and 30 and 32 arranged to be parallel to each other in the construction, and sensor member 22 is constructed of a suitable material c of some deflection under load. A suitable material of purpose is aluminum or steel. The connected wall portions 26, 28, 30 and 32 are defined by a U-shaped opening 34 which extends transversely through the sensor block member 22 being formed by connected opening portions 36, 38 and 40. The opening portion 34 is in FIG. 1 extending horizontally through the sensor block 22 although the actual orientation of the opening is only important as it relates to the direction of the forces that are applied to the sensor assembly 20. The upper and lower opening portions 36 and 40 extend adjacent respectively to the upper and lower surfaces 46 and 48 of the sensor block 22, and the location and shape of the opening portions 36 and 40 and their distance from the respective surfaces 46 and 48 is important to the operation. In the sensor block 22 as shown the opening portions 36 and 40 are similar in size and shape and are similarly spaced from the respective surfaces 46 and 48 for reasons which will become apparent.

The upper opening portion 36 is shown having a pair of spaced enlarged or rounded opening portions 50 and 52 which extend to closer to the upper surface 46 than the rest of the opening portion 36 and define therewith relatively thin block portions 54 and 56. In a like manner, the lower opening portion 40 has a similar pair of spaced enlarged or rounded portions 58 and 60 which define with the lower surface 48 relatively thin block portions 62 and 64. The thin block portions 54 and 56 adjacent to the top surface 46 of the sensor block 22 are shown located in opposed relationship to the thin block portions 62 and 64 adjacent to the bottom surface 48 and usually though not necessarily, the thickness of the portions 54 and 56 is similar to the thickness of the portions 62 and 64 for best operation.

The wall portion 26 has a horizontally oriented cross bore 66 shown located centrally in the sensor block 22, and the cross bore 66 is sized to receive end portion 68 of roll shaft 70. The shaft 70 can be locked in fixed position in the portion 28 by suitable means such as by set screws 72 and 74 as shown in FIG. 1. The roll shaft 70 carries spaced bearing assemblies 76 adjacent its opposite ends, and the bearing assemblies 76 rotatably support a tubular roller member 78 over which a web of material such as web 80 extends.

A sensor 20 can be located to support one or both opposite ends of the roll shaft 70, however, if such assemblies are used to support both opposite ends of a roll shaft, some means must be provided to compensate for misalignment. Alternatively, one end of the shaft 70 could be supported by other means as will be described hereinafter.

The sensor block 22 is shown fixedly attached to a supporting wall structure 82 by bolts 84. The wall structure 82 may be a side 1 of a machine or other device used for supporting one or a plurality of rolls over and around which the web member 80 moves during processing for some reason. A similar wall member typically may adjacent to each opposite side of the machine, and each wall may have means such as the sensor block 22 for attaching to supporting one end of the roll shaft 70. A roll shaft could be mounted extending from a single sensor block 22 and used to support a roll over which a web extends or alternatively a shaft could be to support a sheave or pulley around which a strand, as distinguished from a web, of material extends.

Referring again to FIGS. 1 and 2, the sensor wall portion 26 is shown as being substantially thicker over most of its length than the opposite wall portion 28, and a bore or counter bore 86 is provided therein or therethrough to receive a portion of a pin member 88. The free opposite end 90 of the pin 88 which is shown being somewhat smaller in diameter extends into a similarly sized cross bore 92 the wall portion 28. The size or diameter of the bore 92 (or of the pin end portion therein) should be accurately predetermined because the space between the pin portion and the bore 92 in which it extends controls and limits the amount of possible relative movement that can occur between the sensor wall portions 26 and 28 when force is applied thereto by pressure on the roll shaft assembly 24. The same space also limits the amount of possible deflection that can take place in the upper and lower block portions 30 and 32 and hence limits the maximum amount of web tension that can be sensed by the sensor assembly 20.

The web member 80 (or strand) extends over the roller 78 and exerts lateral pressure on the roller 78. The amount of pressure depends upon tension of the web 80. This force or tension is transmitted through the bearing assemblies 76 to the roll shaft 70 and from the roll shaft 70 to the block portion 26. The force thus produced is also applied to the wall portions 30 and 32. Since the block portions 26 and 28 are parallel as are the block portions 30 and 32. Any downward or lateral movement of the wall portion 26 will be parallel to the wall portion 28. This same force acting on the upper and lower wall portions 30 and 32 produces some parallel angular deflection in both block portions 30 and 32, and most of the angular deflection or bending of the portions 30 and 32 will occur in the relatively thin portions 54, 56, 62, and 64, and relatively little if any bending will occur in the thicker parts of the wall portions 30 and 32 positioned therebetween.

Because of the construction of the sensor block 22, as aforesaid, any downward pressure on the block portion 26 will cause the block portion 26 to move parallel, or nearly parallel to the block portion 28 and little or no relatively angular movement will occur therebetween.

The sensor block 22 has transducers 94 and 96 positioned on the upper and/or on the lower surface 46 (and/or 48) at locations immediately above the respective thin portions 54 and 56 so as to respond to any stretching or compression produced thereat when the portion 26 moves downwardly under the load on the web. In the construction as shown, when downward force is applied to the sensor portion 26, tension forces will be produced on the thin portion 54 due to stretching of the surface 46 thereat for sensing by the transducer 94 and compression will be produced in the surface 46 at the thin portion 56 for sensing by the transducer 96. The transducers 94 and 96 are typically connected into a Wheatstone bridge type circuit such as that described in Applicant's Reissue Pat. No. 31,312. The circuits used are not part of this invention.

When downward force is applied to the sensor portion 26, the end portion 90 if the pin 88 moves towardly and eventually as the force increases will move against the wall of the bore 92 to limit the amount of possible movement that can occur between the wall portions 26 and 28. The pin 88 therefore acts to provide overload protection means against damage to the sensor block 22 due to excessive loads being applied. The amount of overload protection provided depends on the diameter of the bore 92 (or the size of the pin portion 90 that extends therein) and this can be adjusted as desired either by selection of a desired stepped pin or by selecting the relative sizes of the bores 86 and 92. The amount of overload protection needed will depend on the materials used in the construction of the sensor block 22, the type of transducers 94 and 96 used, and on the ability of the material used in the construction of the block 22 to be able to return to its unstressed condition after each stressing.

Figure 2:
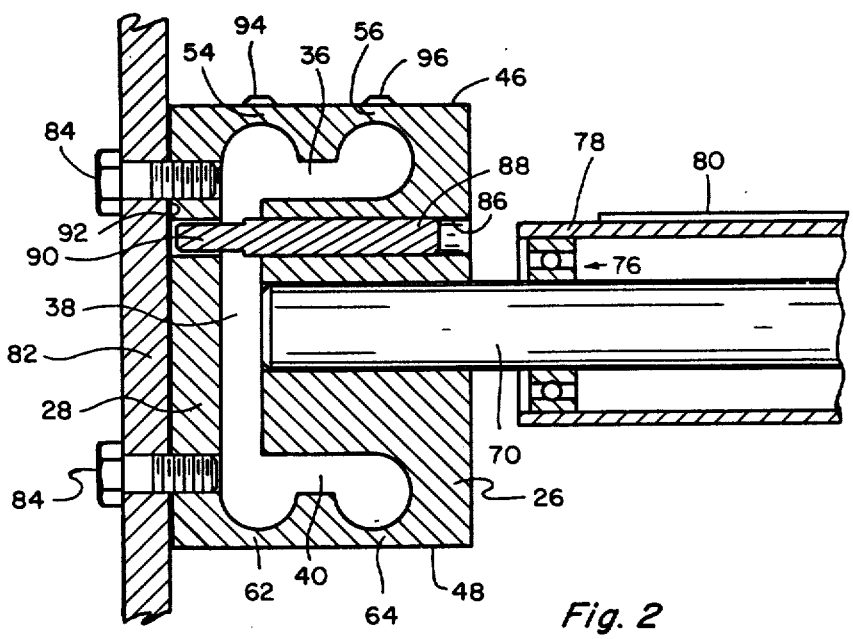
FIG. 2 is a vertical cross-sectional view taken through the center of the sensor device of FIG. 1.

FIG. 2 is a cross-sectional view of the sensor assembly 20 of FIG. 1 and shows more of the details thereof.

Figure 3:
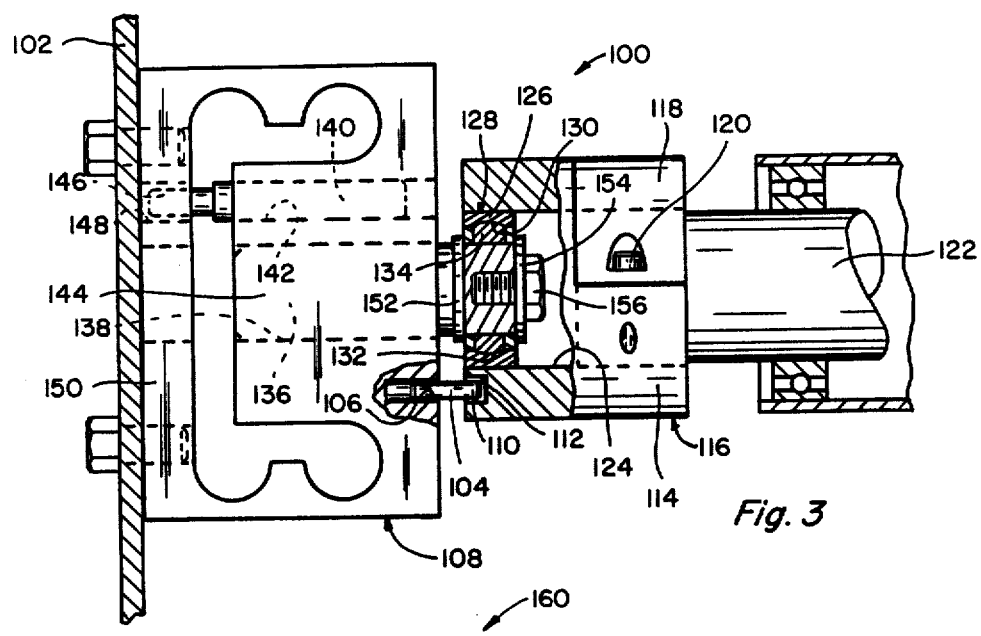
FIG. 3 is a side elevational view showing another embodiment of the present sensor and associated shaft support means.

FIG. 3 shows an alternate embodiment 100 of the subject sensor mounted on frame member 102 similar to the machine wall member 82. The main differences between the construction shown in FIG. 3 and the construction shown in FIGS. 1 and 2 is that it includes a relatively short shaft member or pin 104 mounted in a cross bore 106 in sensor block 108. The pin 104 may be press fit or otherwise anchored in the bore 106 and its free end 110 extending into an oversize counterbore 112 in a mounting member 114 which is part of a shaft mounting assembly 116. The pin 104 is provided to limit relative angular movement between the members 108 and 114 in any angularly related direction.

The assembly 116 includes a detachable portion 118 which is attached thereto by spaced bolts 120 to clamp the assembly 116 onto roll shaft 122 The member 114 has a cross bore 124 aligned with the roll shaft 122 into which an outer race 126 of a spherical bearing assembly 128 is fitted. The race 126 has a concave bearing surface 130 which cooperates with a convex surface 132 on a spherical bearing member 134 which is mounted on a stub shaft 136 which extends into bore 138 in the sensor 108. The roll shaft 122 may have a tubular roll member journaled thereto in the same manner as in the construction shown in FIGS. 1 and 2 over which a web extends.

The construction 100 also has an overload feature provided by stepped pin member 140 which has a larger diameter portion positioned in bore 142 in portion 144 of the sensor block 108 and a smaller diameter portion 146 which extends into bore 148 in block portion 150. The pin 140 operates in the same manner as the overload pin 88 shown in FIGS. 1 and 2.

Another important difference between the constructions 100 and 20 is that in the construction 100 uses the spherical bearing member 128 to facilitate angular movement between the shaft 122 and the stub shaft 136 (and the sensor 108) to minimize the effects of twisting and bending of the shaft 122 under load, and this feature relieves any tendency for inaccurate transducer outputs due to such twisting and bending. The spherical bearing assembly 128 is shown mounted on the stub shaft 136 adjacent one end thereof between spaced washer members 152 and 154, the washer 154 being held in engagement at the end of the stub shaft 136 by threaded member or bolt 156.

Figure 4:
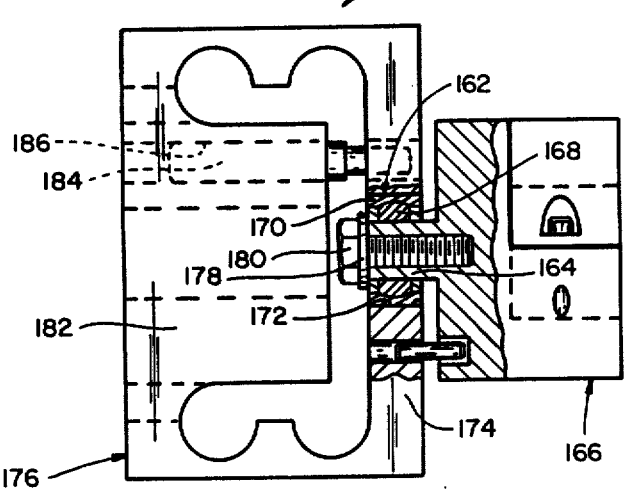
FIG. 4 is a side elevational view showing another embodiment thereof.

FIG. 4 shows another sensor construction 160 which has similarities to the construction shown in FIG. 3 except that in the construction shown in FIG. 4 the spherical bearing assembly 162 is positioned in a bore in portion 174 of the sensor block 176 and is mounted on a tubular extension 164 of roll shaft mounting assembly 166. The spherical bearing 168 is therefore mounted on the extension 164 and engages concave surface of race member 170 which is positioned in bore 172 in wall portion 174 of the sensor block 176. The bearing assembly 162 is held in position on the mounting assembly 166 by means of washer 178 and threaded member or bolt 180. Note also that in the construction of FIG. 4 outboard block portion 182 is shown as the thicker wall portion and is the portion that is attached to a fixed support structure. The construction 160 also has an overload feature in the form of stepped pin 184 fixedly mounted in bore 186 in the wall portion 182 rather than being mounted in the inboard block portion 174. Except for these differences the construction shown in FIG. 4 is similar to and operates in a manner similar to the construction 100 shown in FIG. 3.

FIG. 5 shows another embodiment 200 of a sensor assembly which is likewise similar to the construction shown in FIGS. 1 and 2 including having a roll shaft 202 m in a cantilever manner in bore 204 in sensor block portion sensor block 208. In this construction, as in the other constructions, transducers 209 and 210 are mounted on the upper block faces 211 and 212 adjacent to relatively thin blocks 214 and 216. The construction shown in FIG. 5 also an overload pin 220 mounted in bore 221 in the block portion 206, said pin having a free end portion 222 which extends into an oversize bore 224 in block portion 226. The embodiment of FIG. 5 should also be compared to the construction shown in FIG. 6 wherein both sensor blocks 208 and 230 are similar in construction but are mounted on opposite sides of the support wall 228. For example, the block 208 is mounted in the inboard side of the support wall 228 while the block 230 is mounted on the outboard side thereof. An advantage of the construction shown in FIG. 6 is that the same machine can be made to accommodate a longer roll shaft 232 and hence a wider web 234. Another advantage is to be able to bring the web closer to the machine frame. In both constructions the respective roll shafts 202 and 232 can also be made to extend through oversized openings 236 and 238 respectively to provide overload protection, and this can be done without the necessity of a separate overload pin and associated openings. However, if the roll shaft is not made to extend through an oversize opening as in FIG. 6 an overload pin such as described above should be used.

FIG. 7 is an enlarged cross-sectional view of the construction shown in FIG. 6 and is included to show the web 234 extending over and around a portion of roller 240. The arrows 242 are included to illustrate the tension force on the web 234, which force bears against the roll shaft 232 and against the sensor block 230.

FIG. 8 shows another sensor embodiment 250 wherein web feed roll 252 has an integral extension 254 which is supported for rotation in spaced bearing assemblies 256 positioned in bore opening 258 in the sensor block portion 260. The construction shown in FIG. 8 provides overload protection by means in the form of stepped pin 262 and sensor block bores 264 and 266. Except for the differences noted, the construction shown in FIG. 8 is similar to and operates similarly to the other constructions shown and described above.

FIG. 9 shows sensor block embodiment 300 with a bore 302 for supporting a roll shaft having an extension 304 which extends at right angles to the other constructions described above. This construction provides an alternative way to mount the block 300 and it has application to machines where it may be desirable for some reason to mount the block on a side face of a support structure. The roll shaft extension 304 in this construction can not provide its own overload protection and an overload pin such as described above can be provided as shown in dotted outline.

FIG. 10 shows a cross-section of the support means of FIG. 9 for roll shaft 320 which, unlike the construction shown in FIG. 8, has spaced bearing assemblies 322 and 324 mounted in the bore 302 in the sensor block 300. Except for these differences the construction shown in FIG. 10 is similar to and operates similarly to the construction shown in FIG. 8.

FIG. 11 shows an embodiment wherein two reduced diameter opposite end portions 342 and 344 of roll shaft 346 are supported differently in respective sensors 348 and 350. In the case of the sensor 348, the reduced diameter roll portion 342 is supported by a bearing assembly 349 and the opposite end portion 344 is supported by spherical bearing assembly 352 which operates similarly to the spherical bearing assembly shown in FIGS. 3 and 4. Bending and twisting forces produced in the roll shaft 346 are neutralized by the spherical bearing 352 in the manner described above.

Figure 12:
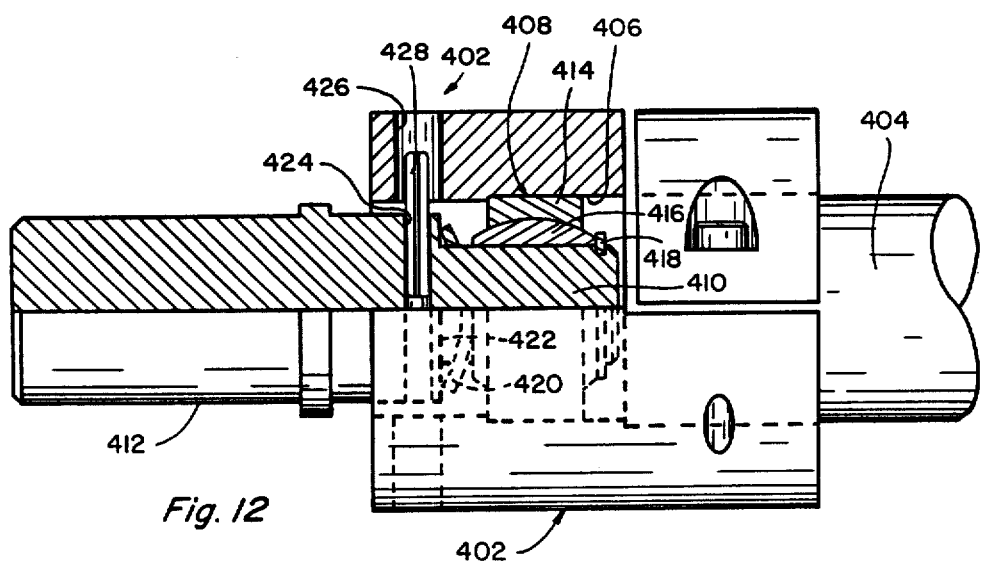
FIG. 12 is a fragmentary cross-sectional view showing another form of roll shaft support means for use with a sensor device constructed according to the teachings of the present invention, said support means including means to prevent distortion due to relatively angular movement between the sensor device and the roll shaft.

FIG. 12 shows an embodiment of roll support means which are adaptable for use with sensor means constructed according to the present invention. The roll support means includes a roll support assembly 402 with means thereon for clamping onto a roll shaft 404 in the manner indicated. The assembly 402 has a bore 406 for receiving a spherical bearing assembly 408 which is mounted on a reduced diameter portion 410 of a stub shaft 412. The spherical bearing assembly includes an outer race 414 with a concave bearing surface which engages the convex bearing surface on a spherical bearing 416. The spherical bearing is held in position on the shaft extension 410 by means of a locking ring 418 positioned in a groove provides therefor. The opposite side of the spherical bearing is biased against the locking ring 418 by a loaded spring 420 which bears against a shoulder 422 on the stub shaft 412. The stub shaft also has a cross bore 424 which is aligned with an oversized bore 226 in the assembly 402. A pin member 428 is fixedly positioned in the bore 424 and extends outwardly therefrom into the oversized bore 426. The pin 428 is provided to limit relative angular movement in any direction between the stub shaft 412 and the mounting assembly 402. The stub shaft 412 extends into a suitable bore provided therefor in a sensor block such as those described above. The construction and operation of the sensor block is similar to those described above.

FIG. 13 shows an embodiment of the subject device particularly adaptable for use in supporting a live shaft which is a shaft wherein the entire shaft member such as shaft member 450 rotates. The shaft 450 includes a central roll portion 452 around which a web member extends and a smaller diameter end portion 454 which is the portion that is rotatably supported as will be shown. In the construction as shown in FIG. 13, portions or the end portions 454 at both opposite ends of the live shaft 450 extend through similar inner races 456 of bearing assemblies 458. The inner races 456 have spaced annular bearing surfaces 462 and 464 which engage respective rows 466 and 468 of ball bearings. The bearing rows 466 and 468 engage spaced locations on a concave bearing surface 470 on the outer race member 460. This construction enables the rows 466 and 468 to move laterally to some extent on the surface 470 to compensate for flexing or bending of the roll shaft 450 under load. In the construction shown in FIG. 13, as indicated, both opposite ends of the live shaft 450 may be similarly supported.

The bearing assemblies 458 at each opposite end of the roll shaft are mounted in counterbores 472 in similar portions 474 of mounting members 476. The endwardly extending shaft portions 478 extend into and are supported by sensor means or blocks of the types described above. The importance of the construction shown in FIG. 13 is that it provides means to rotatably support a live roll shaft as distinguished from a dead or non-rotatable shaft in a manner that overcomes or compensates for the effects of angular deflection of the roll shaft under load, and therefore it does not require pins or other means such as the pin 428 shown in FIG. 12 to prevent relative rotational movement between the members. This is accomplished in the construction of FIG. 13 by the construction of the bearing assemblies. Also, and importantly, with this construction the entire live roll shaft 450 is able to freely rotate. The roll support means shown in FIG. 13, however, cannot be used to support a cantilevered construction for obvious reasons.

The various sensor means disclosed have special utility in supporting various types of roll shafts including cantilevered and non-cantilevered shafts as well as dead and live roll shafts over which or around which a web or strand of material extends whose tension is to be measured or monitored. This means that machines which have rollers around which web members extend can be constructed to be open-sided on one side in the case of the cantilevered construction so that the web being wound is very accessible, and they can be used with machines that have spaced side walls with roll shafts supported at each opposite end thereby.

Thus there has been shown and described several embodiments of a novel sensor construction and roll support means, all of which are relatively simple and inexpensive to manufacture and install, and all of which are highly accurate and versatile and in some cases enable the same machine to be used to accommodate different width webs. The present sensors also provide novel overload protection which can be differently constructed and situated as described. The present construction therefore fulfills all of the objects and advantages sought therefor. It will be apparent to those skilled in the art, however, that many changes, modifications, variations and other uses and applications for the subject device are possible, and all such changes, modifications, variations and other uses and applications which do not depart from the spirit and scope of the invention are deemed to be covered by the invention which is limited only by the claims which follow.

What is claimed is:

1. A load sensor device and a shaft member supported thereby over and around which a web extends and moves whereby tension on the web exerts force on the shaft member and on the load sensor device, the sensor device including a block of metal material having an opening extending therethrough to form first and second pairs of opposed and connected block portions, one portion of the first pair having means for attaching the block to a supporting structure, the other portion of said first pair having a cross bore therethrough for receiving a portion of the shaft member therein, the second pair of opposed block portions connected at spaced locations to the first pair of block portions whereby the first pair of block portions are allowed movement in parallel relation to each other when pressure is applied to the shaft member and to the block portion that provides support therefor while the second pair of block portions undergoes parallel deflection, means forming areas of reduced cross-section in at least a portion of the second pair of block portions, transducer means attached to the block adjacent to selected ones of areas of reduced cross-section to generate responses representative of the deflection produced in the respective areas of reduced cross-section when the other portion of said first pair of block portions moves under load relative to the portion of the first pair attached to the support structure, and means to limit the amount of relative movement that can take place between the first pair of block portions.

2. The load sensor device of claim 1 wherein the means to limit the amount of relative movement includes a pin mounted in one portion of said first pair of block portions and an aligned opening in the other portion of said first pair into which a portion of the pin extends, the size of the opening into which the portion of the pin extends relative to the size of said pin portion limiting the amount of relative movement that can take place between the first pair of opposed block portions.

3. The load sensor device of claim 1 wherein the means to limit the amount of relative movement includes aligned openings through the portions of the first pair of opposed block portions through which the shaft member extends, one of said aligned openings being sized to just accommodate the shaft member and the other aligned opening being larger than the shaft member to enable limited movement of the shaft member therein.

4. The load sensor device of claim 1 wherein when the block is attached to the supporting structure the shaft member extends outwardly normal to the supporting structure.

5. The load sensor device of claim 1 wherein when the block is attached to the supporting structure the shaft member extends outwardly in parallel relation to the supporting structure.

6. The load sensor device of claim 1 wherein one of the first pair of block portions has a substantially greater cross-sectional thickness than the other.

7. The load sensor device of claim 1 wherein the block is mounted on the same side of the supporting structure as the shaft member.

8. The load sensor device of claim 1 wherein the block is mounted on the side of the supporting structure opposite from which the shaft member extends.

9. The load sensor device of claim 1 wherein the means for attaching the other of said first block portions to the shaft member includes a spherical bearing having a first portion mounted in the block and a second portion attached to the shaft member.

10. The load sensor device of claim 1 including a separate load sensor device attached to each opposite end of the shaft member and means to enable as least one end of the shaft to move angularly relative to the block associated therewith.

11. The load sensor device of claim 1 including spherical bearing means positioned between the shaft member and the block, and yieldable means urging the spherical bearing means into a predetermined position on the shaft member.

12. The load sensor device of claim 1 including a bearing assembly positioned between the shaft member and the portion of the first pair of block portions having means for supporting the shaft member.

13. The load sensor device of claim 1 wherein the shaft member includes a roll shaft with a tubular member journaled thereto for rotation thereon.

14. Improved strain sensing means to measure tension on a web member comprising a frame member, a shaft having an axis extending outwardly from the frame member and having web engaging means mounted thereon, strain sensing means connecting one end portion of the shaft to the frame member, said strain sensing means including a block member having spaced and opposed first and second wall portions located to be arranged substantially normal to the axis of the shaft, means connecting said first wall portion to the frame member, a cross-bar in the second wall portion of the block member for receiving and supporting a portion of the shaft member therein, said block member having two spaced and opposed third and fourth wall portions extending between and integrally connecting the spaced first and second wall portions, said third wall portion having spaced relatively thin stress concentrating areas therein capable of limited deflection when the second wall portion is moved under load relative to the first wall portion, said stress concentrating areas having cross-sectional shapes which are substantially wider in one direction than in another direction so that when force is exerted on the shaft and on the second wall portion through which the shaft extends by tension of a web member passing thereover substantially parallel deflection will occur in the third and fourth wall portions, and strain sensing transducer means located on the third wall portion adjacent at least one stress concentration area for producing a response that is representative of the tension on the web, the shaft extending into the cross-bore in the second wall portion at least to a location aligned transversely with a portion of the transducer means so that some force from the shaft is directed substantially normal to said portion of the transducer means.

15. A load sensor comprising a block having opposed side, edge and end faces and an opening therethrough extending between the side faces, said opening having spaced portions extending adjacent to the end faces and a portion connected therebetween forming connected block portions adjacent to the end and edge faces thereof, means on one of the block portions adjacent to an edge face for attachment to fixed support structure and means including a bore through the block portion adjacent the opposite edge face for receiving and supporting a roll shaft over which a flexible member whose tension is to be sensed extends whereby tension on the flexible member causes lateral pressure on the roll shaft and on the bore through the block portion through which the roll shaft extends whereby some relative movement occurs in the block between the opposed block portions adjacent to the opposed edge faces, means to limit the amount of possible relative movement that can occur between said opposed block portions including a stop m ember having a first portion attached to one of said opposed block portions, means on the other of said opposed block portions for engagement by said stop member when predetermined relative movement occurs between said opposed block portions, and transducer means on at least one of the block end faces to respond to deflections that occur in the block portion adjacent said block end face when the opposed block portions move relative to each other.

16. The load sensor of claim 15 wherein the spaced opening portion adjacent to at least one of the end faces has spaced enlarged opening portions forming block portions between the associated enlarged opening portions and the adjacent block end face that are of relatively narrow cross-section, the transducer means being mounted on said one end face of the block adjacent to said relatively narrow cross-section block portions.

17. The load sensor of claim 15 wherein the means to limit the amount of possible relative movement between the opposed block portions include aligned openings in said opposed block portions, and the stop member includes a pin fixedly positioned in one of the aligned openings, the means on the other of said opposed block portions for engagement by said pin is the aligned opening in said other opposed block portion, the other aligned opening being larger in cross-section than the pin portion that extends therein to limit the possible relative movement between the opposed block portions.

18. The load sensor of claim 15 wherein the stop member includes a portion of the roll shaft.

19. The load sensor of claim 15 including means to permit limited angular movement between the roll shaft and the sensor block.

20. The load sensor of claim 19 wherein the means to permit limited angular movement includes spherical bearing means having a first portion mounted on the roll shaft and a second portion mounted in the bore in the block portion adjacent to the opposite edge face.

21. The load sensor of claim 15 wherein the means on one of the opposed block portions for attachment to a fixed support structure includes means to enable mounting the block on either opposite side of the support structure.

22. The load sensor of claim 15 wherein the means for receiving and supporting the roll shaft on one of the opposed block portions extend outwardly at right angles from the support structure.

23. The load sensor of claim 15 wherein the bore through the block portion adjacent to the opposite edge face receives and supports the roll shaft extending outwardly therefrom in parallel relation to the support structure at the locations where the block is attached thereto.

24. The load sensor of claim 15 including bearing means positioned between the roll shaft and the bore through the block portion adjacent to the opposite edge face to rotatably support the roll shaft.

25. A sensor device which responds to tension on a web movable against a roll including a roll shaft, said sensor device including means for supporting the roll shaft over and around which a web extends whereby tension on the web exerts lateral force on the roll shaft and on the sensor device, the sensor device including a block member having spaced side, end and edge faces and having an opening extending therethrough between the spaced side faces to establish in the block member pairs of opposed block portions adjacent to the end faces and pairs of block portions adjacent to the edge faces, the block portion adjacent to one of the edge faces having a cross bore therein for receiving and supporting the roll shaft, means for attaching the block member adjacent to the other of the edge faces to a supporting structure, the pair of opposed block portions adjacent to the end faces being connected at spaced locations to the pair of block portion is adjacent the edge faces whereby the pair of block portions adjacent to the edge faces are permitted limited relative movement parallel to each other due to pressure on the roll shaft caused by tension on the web and on the cross bore through which the roll shaft extends, means forming areas of reduced cross-section in at least one portion of the pair of block portions adjacent the respective end faces whereby the deflection in said one portion will be concentrated in said areas when the block portions adjacent the edge faces move relative to each other, transducer means attached to the block portion adjacent to the areas of reduced cross-section to produce responses representative of deflections produced therein when the block portions adjacent the edge faces move relative to each other under load on the roll shaft, and means on one of said block portions adjacent the edge faces engageable with the other portion of said pair to limit the amount of relative movement that can take place between the portions of said pair.

26. The sensor device of claim 25 wherein the means to limit the amount of relative movement includes a pin member mounted on one of the said portions adjacent said block edge faces and an opening in the other portion of said pair into which the pin extends, the size of the opening relative to the size of the pin member extending therein controlling the amount of possible relative movement that can take place between the portions of the block adjacent to the edge faces thereof.

27. The sensor device of claim 25 wherein the means to limit the amount of relative movement includes aligned cross bores through the portions of said block adjacent to the edge faces, the roll shaft member extending through said aligned cross bores, one of said aligned cross bores being sized to accommodate the shaft member and the other aligned cross bore being larger in diameter than the roll shaft member to enable limited lateral movement of the roll shaft member therein.

28. A load sensor for producing responses representative of web tension on a roll shaft over which a web member extends comprising a block having opposed side, edge and end faces and an opening therethrough extending between the side faces, said opening having spaced portions extending adjacent to the respective end faces and a portion connected therebetween, said opening forming opposed first and second pairs of block portions adjacent respectively to the end and edge faces thereof, means on one of the second pair of block portions adjacent to an edge face for attachment to a fixed support structure, means including a bore in the other of said second pair of block portions for receiving and supporting a roll shaft over which a web member extends whereby tension on the web member causes lateral pressure on the roll shaft and on the other of said second pair of block portions through which the roll shaft extends whereby some relative movement occurs in the block between the opposed second pair of block portions, means to limit the amount of possible relative movement that can occur between said second pair of block portions including a member fixedly mounted on one of the second pair of block portions, means on the other of said second pair of block portions for engagement by said member to limit the amount of relative movement that can take place between said second pair of block portions, and transducer means mounted on at least one end face of the block to respond to deflections that occur in the respective first pair of block portions when the portions of the second pair of block portions move relative to each other.

29. The load sensor of claim 28 wherein at least one of the spaced opening portions adjacent to at least one of the block end faces includes spaced enlarged opening portions that form block areas of relatively narrow cross-section between the opening portions and the adjacent block end face, the transducer means being mounted on the block adjacent to said block areas.

30. The load sensor of claim 28 wherein the means to limit the amount of possible relative movement between the second pair of block portions includes aligned openings in said second pair of block portions, the member fixedly mounted on one of the second pair of block portions includes a pin having a first portion fixedly positioned in one of the aligned openings, the means on the other of said second pair of block portions including the other of said pair of aligned openings, and a second portion of the pin extendable into the other of said pair of aligned openings, said other of said pair of aligned opening being larger in cross-section than the second pin portion to permit limited relative movement between the pin and the other aligned opening.

31. The load sensor of claim 28 wherein the means to limit the amount of possible relative movement between the second pair of block portions includes a bore through said one of said second pair of block portions aligned with the bore in the other one of the second pair of block portions, the member fixedly mounted including the roll shaft.

32. The load sensor of claim 28 including means to permit limited angular movement between the roll shaft and the sensor block.

33. The load sensor of claim 32 wherein the means to permit limited angular movement includes spherical bearing means having a first portion mounted on the roll shaft and a second portion mounted in the sensor block.

34. The load sensor of claim 28 wherein the means on one of the block portions for attachment to a fixed support structure includes means to enable mounting the block on either opposite side of the support structure.

35. The load sensor of claim 28 wherein the bore in the other of said second pair of block portions for receiving and supporting the roll shaft is oriented so that the roll shaft extends outwardly at right angles to the support structure.

36. The load sensor of claim 28 wherein the bore of the other of said second pair of block portions for receiving and supporting the roll shaft is oriented so that the roll shaft extends therefrom in parallel relation to the support structure at the locations where the block is attached thereto.

37. The load sensor of claim 28 including bearing means in the bore in the other of said second pair of block portions for rotatably receiving and supporting the roll shaft therein.

38. Strain sensing means to measure tension on a strand comprising a frame member, a shaft extending from the frame member and having strand engaging means mounted thereon, a strain sensing means connecting an end portion of the shaft to the frame member, said strain sensing means including a block having spaced and opposed wall members located to be substantially normal to the axis of the shaft, one of said wall members being connected to the frame member and the other wall member having a bore therein for receiving and supporting the shaft, at least two spaced and opposed deflectable block portions extending between and integrally connecting the spaced wall members, at least one of said deflectable portions having portions of reduced cross-section to form areas of stress concentration where said deflectable portion undergoes most of its deflection under load, said deflectable portions having cross-sectional shapes which are substantially wider in one direction than in another direction such that when force is exerted on the shaft by the tension of a strand passing thereover substantially parallel deflection of the deflectable portions will occur, and strain sensing transducer means located on the strain sensing means adjacent to the stress concentration areas of at least one of said deflectable portions for producing responses representative of tension on the strand, the shaft extending through the bore at least to a depth in the block aligned transversely with a portion of the transducer means.

* * * * *

UNITED STATES PATENT AND TRADEMARK OFFICE
CERTIFICATE OF CORRECTION

PATENT NO. : 4,899,599

DATED : February 13, 1990

INVENTOR(S) : Gerald R. Eddens

It is certified that error appears in the above—identified patent and that said Letters Patent is hereby corrected as shown below:

Column 5, line 4, "a" (2nd Occur.) should be --although--.

Column 5, line 9, after "30" insert --and--.

Column 5, line 13, "c" should be --capable--.

Column 5, line 57, after "sensor" insert --assembly--.

Column 6, line 1, after "may" insert --be located--.

Column 7, line 2, "if" should be --of--.

Column 12, line 64, delete "m ember" and insert --member--.

Signed and Sealed this

Tenth Day of September, 1991

Attest:

HARRY F. MANBECK, JR.

Attesting Officer

Commissioner of Patents and Trademarks